(No Model.)
E. WENIGMANN.
ICE PICK.
No. 477,919. Patented June 28, 1892.
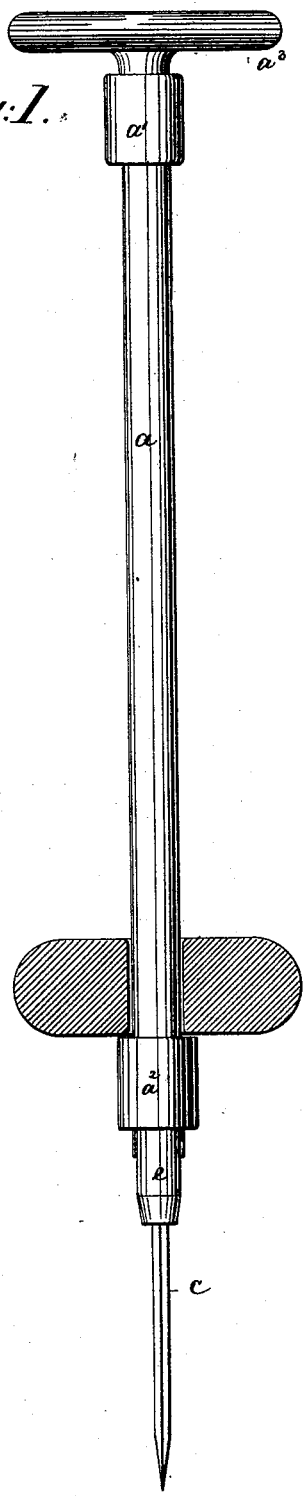
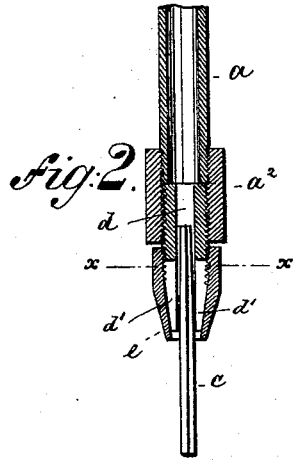
WITNESSES:
A. Schehl.
Wm. Schultz.
INVENTOR
E. Wenigmann
BY Roeder & Briesen
ATTORNEYS.

UNITED STATES PATENT OFFICE.

ERNEST WENIGMANN, OF NEW YORK, N. Y.

ICE-PICK.

SPECIFICATION forming part of Letters Patent No. 477,919, dated June 28, 1892.

Application filed February 5, 1892. Serial No. 420,463. (No model.)

*To all whom it may concern:*

Be it known that I, ERNEST WENIGMANN, of New York city, New York, have invented an Improved Ice-Pick, of which the following is a specification.

This invention relates to an ice-pick so constructed that the cutting-blade can be gradually forced into the ice without being reciprocated, as heretofore. Thus chips will not fly off, and the ice can be broken upon a plate or other fragile support without danger to the latter.

The invention consists in the various features of improvement more fully pointed out in the claim.

In the accompanying drawings, Figure 1 is an elevation, partly in section, of my improved ice-pick; Fig. 2, a longitudinal section through the coupling; and Fig. 3, a cross-section on line $x\ x$, Fig. 2.

The letter $a$ represents a rod provided at its top and bottom with enlargements or collars $a'\ a^2$. Between these collars the rod is embraced by an annular hammer $b$, that may be reciprocated upon the rod by hand. At its upper end the rod $a$ terminates in a handle $a^3$, while at its lower end it is provided with a coupling, by which an awl-shaped cutter $c$ may be secured to it. This coupling is shown to consist of a tube $d$, terminating in four (more or less) spring-jaws $d'$. The tube as well as the spring-jaws are threaded on their outer surface. The tube is connected to the lower threaded end of the rod by the collar $a^2$, which is made in the form of a nut, while the spring-jaws $d'$ are tapered and are surrounded by a tapering nut $e$. It will be seen that the nut $a^2$ has a double function in forming a striking-surface for the hammer and in attaching the coupling to the rod. By screwing the nut $e$ down the jaws $d'$ are permitted to diverge and to thus loosen their hold upon the tool; but when the nut is screwed up the jaws are tightly forced against the tool to secure the same to the rod $a$.

In use the pick is placed with the awl $c$ upon the ice, and then the hammer $b$ is rapidly reciprocated to strike the lower shoulder $a^2$ and to gradually force the awl into the ice. The latter is thus broken rapidly, delicately, and without producing chips.

What I claim is—

The combination of a rod with a surrounding annular hammer, a coupling for the attachment of an awl, and a nut that constitutes a shoulder for the hammer, and a means for attaching the rod to the coupling, substantially as specified.

ERNEST WENIGMANN.

Witnesses:
   F. V. BRIESEN,
   A. JONGHMANS.